United States Patent
Lim et al.

(10) Patent No.: US 11,502,364 B2
(45) Date of Patent: Nov. 15, 2022

(54) BATTERY ASSEMBLY FOR VEHICLE FOR IMPROVING CRASH SAFETY THEREOF

(71) Applicants: Hyundai Motor Company, Seoul (KR); Kia Motors Corporation, Seoul (KR)

(72) Inventors: Hae Kyu Lim, Bucheon-si (KR); Yu Ri Oh, Hwaseong-si (KR); Tae Hyuck Kim, Ansan-si (KR); Gyung Hoon Shin, Seoul (KR); Yong Hwan Choi, Seoul (KR); Ji Woong Jung, Anyang-si (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 128 days.

(21) Appl. No.: 17/025,072

(22) Filed: Sep. 18, 2020

(65) Prior Publication Data

US 2021/0184194 A1   Jun. 17, 2021

(30) Foreign Application Priority Data

Dec. 16, 2019 (KR) .................. 10-2019-0167815

(51) Int. Cl.
*H01M 50/20* (2021.01)
*H01M 50/10* (2021.01)
*H01M 50/147* (2021.01)

(52) U.S. Cl.
CPC ............ *H01M 50/20* (2021.01); *H01M 50/10* (2021.01); *H01M 50/147* (2021.01); *H01M 2220/20* (2013.01)

(58) Field of Classification Search
CPC ........ B60K 1/04; H01M 50/10; H01M 50/20; H01M 2220/20; H01M 50/147
See application file for complete search history.

(56) References Cited

U.S. PATENT DOCUMENTS

| | | | | |
|---|---|---|---|---|
| 4,365,681 A | * | 12/1982 | Singh | H01M 50/20 180/68.5 |
| 6,659,837 B1 | * | 12/2003 | Lieberman | A63H 17/262 446/454 |
| 8,403,090 B2 | * | 3/2013 | Fujiwara | H01M 50/20 429/96 |

* cited by examiner

*Primary Examiner* — James A English
*Assistant Examiner* — James J Triggs
(74) *Attorney, Agent, or Firm* — Morgan, Lewis & Bockius LLP

(57) ABSTRACT

A battery assembly for a vehicle, may include a battery case including a front wall structure, a rear wall structure, and a pair of side walls connected to the front wall structure and the rear wall structure; and a battery cover with which a top portion of the battery case is covered, wherein the front wall includes a front flat wall and a pair of front inclined walls which are opposite on both sides of the front flat wall, and each front inclined wall is formed to be inclined from the front flat wall to a front end portion of a corresponding side wall among the pair of side walls.

18 Claims, 4 Drawing Sheets

BATTERY ASSEMBLY FOR VEHICLE FOR IMPROVING CRASH SAFETY THEREOF

CROSS-REFERENCE TO RELATED APPLICATION

The present application claims priority to Korean Patent Application No. 10-2019-0167815, filed on Dec. 16, 2019, the entire contents of which is incorporated herein for all purposes by this reference.

BACKGROUND OF THE INVENTION

Field of the Invention

The present invention relates to a battery assembly for a vehicle, and more particularly, to a battery assembly for a vehicle capable of improving crash safety and reducing cost.

Description of Related Art

Lately, as the perception of environmental crisis and depletion of oil resources has increased, research and development of eco-friendly electric vehicles have actively been conducted. Electric vehicles include plug-in hybrid electric vehicles (PHEVs), battery electric vehicles (BEVs), fuel cell electric vehicles (FCEVs), etc.

An electric vehicle is provided with a battery assembly which is mounted to a vehicle body. To mount the battery assembly, it is important to secure an adequate mounting space on the vehicle body. Furthermore, since the workability of mounting the battery assembly with a large volume and weight on the vehicle body is also an important issue, those skilled in the art are focusing on research and development of vehicle body design for mounting the battery assembly.

The battery assembly includes a plurality of battery modules, electric/electronic components associated with the battery modules, a battery case in which the battery modules and the electric/electronic components are mounted, and a battery cover with which the top portion of the battery case is covered. The battery assembly may be mounted under a floor of the vehicle body, and a front sub-frame may be located in front of the battery assembly. High voltage electric/electronic components such as a high voltage fuse and a high voltage connector may be mounted on the front of the battery case. The battery case may be mounted on the floor of the vehicle body through front mounting bolts, side mounting bolts, rear mounting bolts, etc.

In the battery assembly according to the related art, the front sub-frame hits the front of the battery assembly during a front impact (or front collision) of the vehicle, resulting in severe deformation or damage of the front mounting bolts and high voltage electric/electronic components.

Furthermore, the battery assembly according to the related art has a complex front structure of the battery case, resulting in relatively reduced impact performance, a large number of welding spots required, and a complex sealing structure between the battery case and the battery cover which increases the manufacturing cost.

The information included in this Background of the Invention section is only for enhancement of understanding of the general background of the invention and may not be taken as an acknowledgement or any form of suggestion that this information forms the prior art already known to a person skilled in the art.

BRIEF SUMMARY

Various aspects of the present invention are directed to providing a battery assembly for a vehicle configured for improving crash safety and reducing cost.

According to various aspects of the present invention, a battery assembly for a vehicle may include: a battery case including a front wall structure, a rear wall structure, and a pair of side walls connected to the front wall structure and the rear wall structure; and a battery cover with which a top portion of the battery case is covered. The front wall structure may include a front flat wall and a pair of front inclined walls which are opposite on both sides of the front flat wall, and each front inclined wall may be inclined from the front flat wall to a front end portion of a corresponding side wall among the pair of side walls.

The battery assembly may further include a recessed cavity provided in the front of the battery case.

The recessed cavity may be recessed from the front flat wall into a front internal space of the battery case.

The recessed cavity may be defined by a recessed flat wall and a pair of recessed side walls connected to the recessed flat wall, the recessed flat wall may be offset from the front flat wall toward the front internal space of the battery case with a predetermined distance, and the pair of recessed side walls may be opposite on both sides of the recessed flat wall.

A high voltage connector may be mounted on the recessed flat wall.

The battery assembly may further include a reinforcing crossmember mounted between the pair of front inclined walls, and the reinforcing crossmember may extend in a width direction of the battery case.

The battery assembly may further include a plurality of front reinforcement members extending from the reinforcing crossmember toward the front wall, and each of the front reinforcement members may extend in a longitudinal direction of the battery case.

The plurality of front reinforcement members may include a pair of first front reinforcement members connecting the front inclined walls and the reinforcing crossmember.

The plurality of front reinforcement members may further include a pair of second front reinforcement members connecting the recessed flat wall and the reinforcing crossmember.

The battery case may be mounted on a lower member of the vehicle through a front mounting bolt, the front mounting bolt may pass through a front structure of the battery case, and the first front reinforcement member may surround the front mounting bolt.

The lower member may be at least one of a dash panel, a floor panel, and a crossmember between the dash panel and the floor panel.

A bottom surface of a head portion of the front mounting bolt may be located higher than a bottom surface of the battery case.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1:
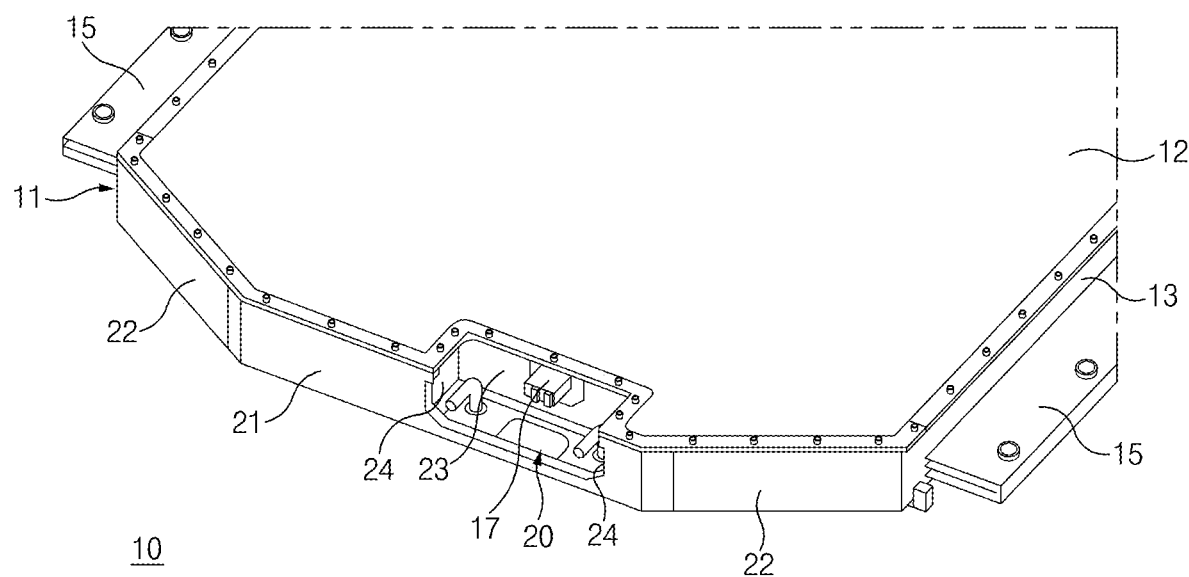
FIG. 1 illustrates a perspective view of a front portion of a battery assembly for a vehicle according to various exemplary embodiments of the present invention.

It may be understood that the appended drawings are not necessarily to scale, presenting a somewhat simplified representation of various features illustrative of the basic principles of the present invention. The specific design features of the present invention as included herein, including, for example, specific dimensions, orientations, locations, and shapes will be determined in part by the particularly intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the present invention(s) will be described in conjunction with exemplary embodiments of the present invention, it will be understood that the present description is not intended to limit the present invention(s) to those exemplary embodiments. On the other hand, the present invention(s) is/are intended to cover not only the exemplary embodiments of the present invention, but also various alternatives, modifications, equivalents and other embodiments, which may be included within the spirit and scope of the present invention as defined by the appended claims.

Hereinafter, various exemplary embodiments of the present invention will be described in detail with reference to the accompanying drawings. In the drawings, the same reference numerals will be used throughout to designate the same or equivalent elements. Furthermore, a detailed description of well-known techniques associated with the present invention will be ruled out in order not to unnecessarily obscure the gist of the present invention.

Terms such as first, second, A, B, (a), and (b) may be used to describe the elements in exemplary embodiments of the present invention. These terms are only used to distinguish one element from another element, and the intrinsic features, sequence or order, and the like of the corresponding elements are not limited by the terms. Unless otherwise defined, all terms used herein, including technical or scientific terms, have the same meanings as those generally understood by those with ordinary knowledge in the field of art to which various exemplary embodiments of the present invention belongs. Such terms as those defined in a generally used dictionary are to be interpreted as having meanings equal to the contextual meanings in the relevant field of art, and are not to be interpreted as having ideal or excessively formal meanings unless clearly defined as having such in the present application.

Referring to FIG. 1, FIG. 2, FIG. 3, and FIG. 4, a battery assembly 10 according to various exemplary embodiments of the present invention may include a battery case 11 in which a plurality of battery modules 14 and electric/electronic components 17 and 19 are received, and a battery cover 12 with which the top portion of the battery case 11 is covered.

The battery case 11 may include a pair of side walls 13, front wall structure 21 and 22, rear wall structure 28 and 29, and a bottom wall 18 supporting the battery modules 14.

The battery case 11 may include a side mount 15 extending outwards from each side wall 13. The side mount 15 may extend in a longitudinal direction of the side wall 13. The side mounts 15 may be connected to a floor panel of the vehicle through side mounting bolts and the like.

The front wall structure 21 and 22 may include a front flat wall 21 and a pair of front inclined walls 22 which are opposite on both sides of the front flat wall 21. The pair of front inclined walls 22 may be disposed symmetrically with respect to a center line of the battery case 11. Each front inclined wall 22 may be inclined from an end portion of the front flat wall 21 to a front end portion of a corresponding side wall among the pair of side walls 13 at a predetermined angle. The front wall structure 21 and 22 may face the front of the vehicle, and a front sub-frame may be located in front of the front wall structure 21 and 22.

The front flat wall 21 may extend along a plane perpendicular to an axis of the battery case 11. During a front impact (or front collision) of the vehicle, when the front sub-frame located in front of the battery case 11 hits the front wall structure 21 and 22, the front flat wall 21 may stably support the front sub-frame, and an impact load may be uniformly distributed along the pair of front inclined walls 22.

Since a front structure of the battery case 11 is simplified by the front flat wall 21 and the pair of front inclined walls 22, welding spots may be relatively reduced, and thus welding quality may be improved and cost may be reduced.

The rear wall structure 28 and 29 may include a rear flat wall 28 and a pair of rear inclined walls 29 which are opposite on both sides of the rear flat wall 28. The pair of rear inclined walls 29 may be disposed symmetrically with respect to the center line of the battery case 11. Each rear inclined wall 29 may be inclined from an end portion of the rear flat wall 28 to a rear end portion of the side wall 13 at a predetermined angle. The rear wall structure 28 and 29 may face the rear of the vehicle, and a rear sub-frame may be located behind the rear wall structure 28 and 29.

The rear flat wall 28 may extend along a plane perpendicular to the axis of the battery case 11. During a rear impact (or rear collision) of the vehicle, when the rear sub-frame located behind the battery case 11 hits the rear wall structure 28 and 29, the rear flat wall 28 may stably support the rear sub-frame, and an impact load may be uniformly distributed along the pair of rear inclined walls 29.

Since a rear structure of the battery case 11 is simplified by the rear flat wall 28 and the pair of rear inclined walls 29, welding spots may be relatively reduced, and thus welding quality may be improved and cost may be reduced.

The battery assembly 10 according to various exemplary embodiments of the present invention may include a recessed cavity 20 provided in the front of the battery case 11.

The recessed cavity 20 may be recessed from the front flat wall 21 into an internal space of the battery case 11. For example, the recessed cavity 20 may be defined by a recessed flat wall 23 and a pair of recessed side walls 24. The recessed flat wall 23 may be offset from the front flat wall 21 toward a front internal space of the battery case 11 with a predetermined distance, and the pair of recessed side walls 24 may be opposite on both sides of the recessed flat wall 23. An axis of the recessed flat wall 23 may be parallel to an axis of the front flat wall 21, and an axis of the recessed side wall 24 may be orthogonal to the axis of the front flat wall 21.

Figure 2:
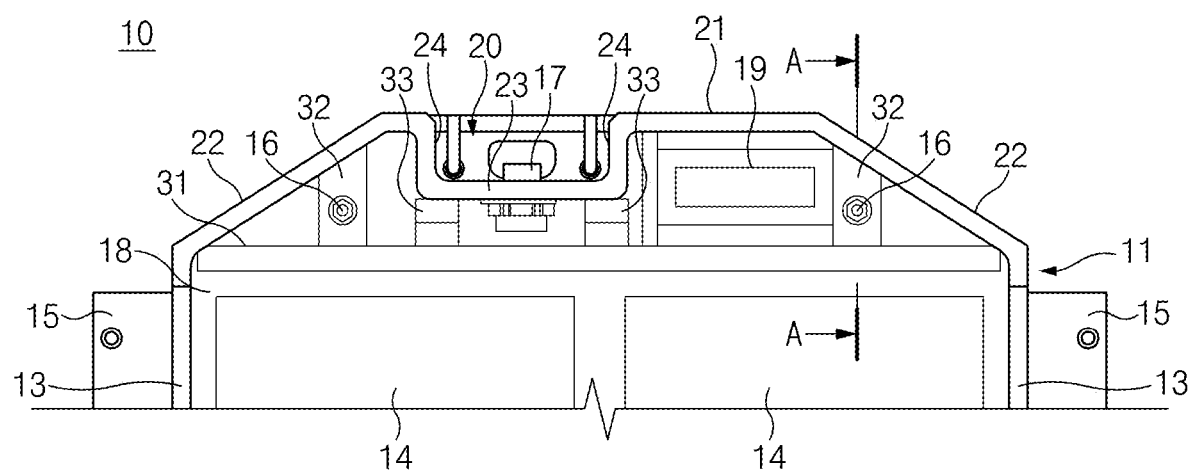
FIG. 2 illustrates a plan view of a front internal space of a battery case in a state in which a battery cover is removed from a battery assembly for a vehicle according to various exemplary embodiments of the present invention.
Figure 3:
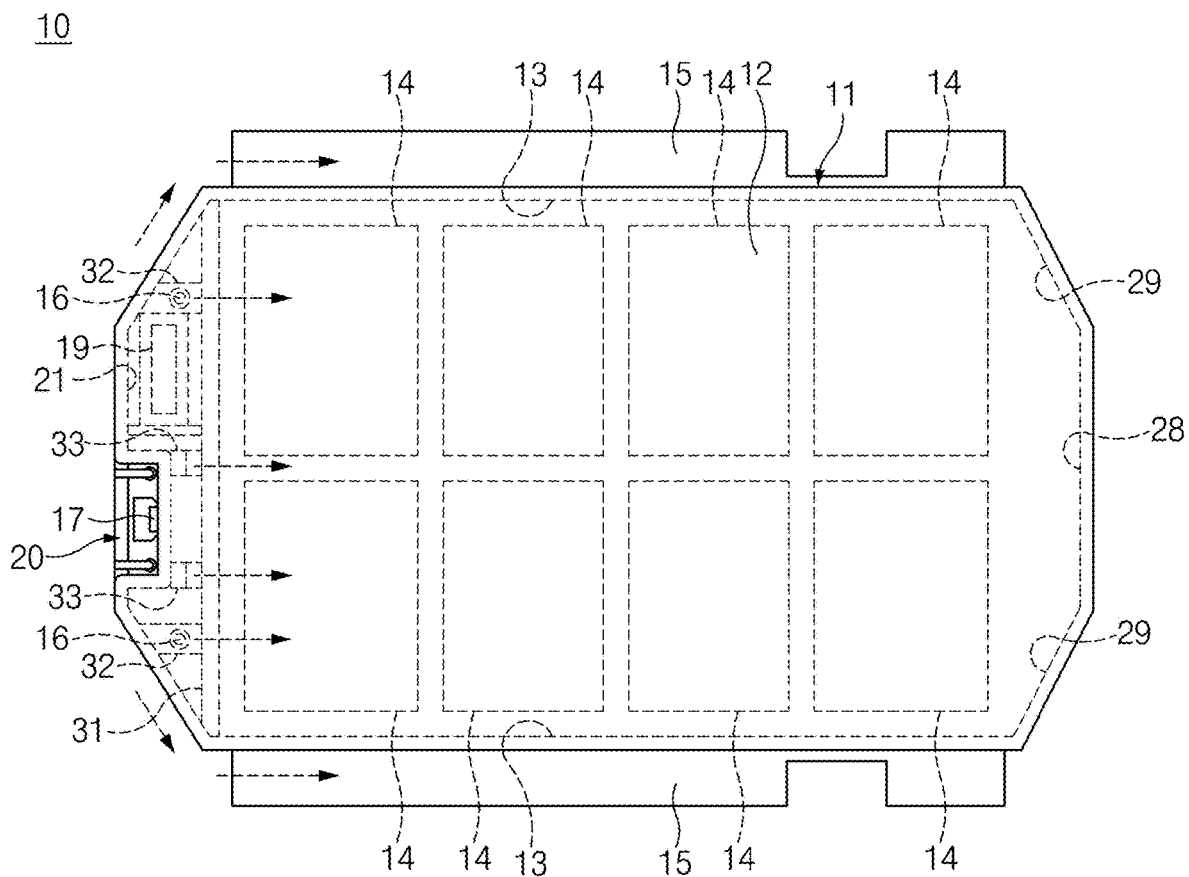
FIG. 3 illustrates a plan view of a battery assembly for a vehicle according to various exemplary embodiments of the present invention.

An axis of the recessed cavity 20 may be parallel to the axis of the battery case 11. As illustrated in FIG. 1, FIG. 2, and FIG. 3, the axis of the recessed cavity 20 may be offset with respect to the axis of the battery case 11.

High voltage electric/electronic components such as a high voltage connector 17 and a high voltage fuse 19 may be mounted in the front internal space of the battery case 11 adjacent to the front wall structure 21 and 22. The high voltage connector 17 may be mounted on the recessed flat wall 23, and thus a front portion of the high voltage connector 17 may be located in the recessed cavity 20, and a rear portion of the high voltage connector 17 may be located in the front internal space of the battery case 11. That is, the high voltage connector 17 may be concealed by the recessed cavity 20, and thus disconnection, fire, and/or the like due to damage of the high voltage connector 17 in the event of an impact (collision) may be prevented.

The battery case 11 may be mounted to a lower member of the vehicle through a plurality of mounting bolts. The lower member of the vehicle may be at least one of a dash panel, a floor panel 5, and a crossmember between the dash panel and the floor panel 5. The plurality of mounting bolts may be divided into front mounting bolts fastening the front structure of the battery case 11, side mounting bolts fastening the side mounts 15 of the battery case 11, and rear mounting bolts fastening the rear structure of the battery case 11 according to mounting positions.

Figure 4:
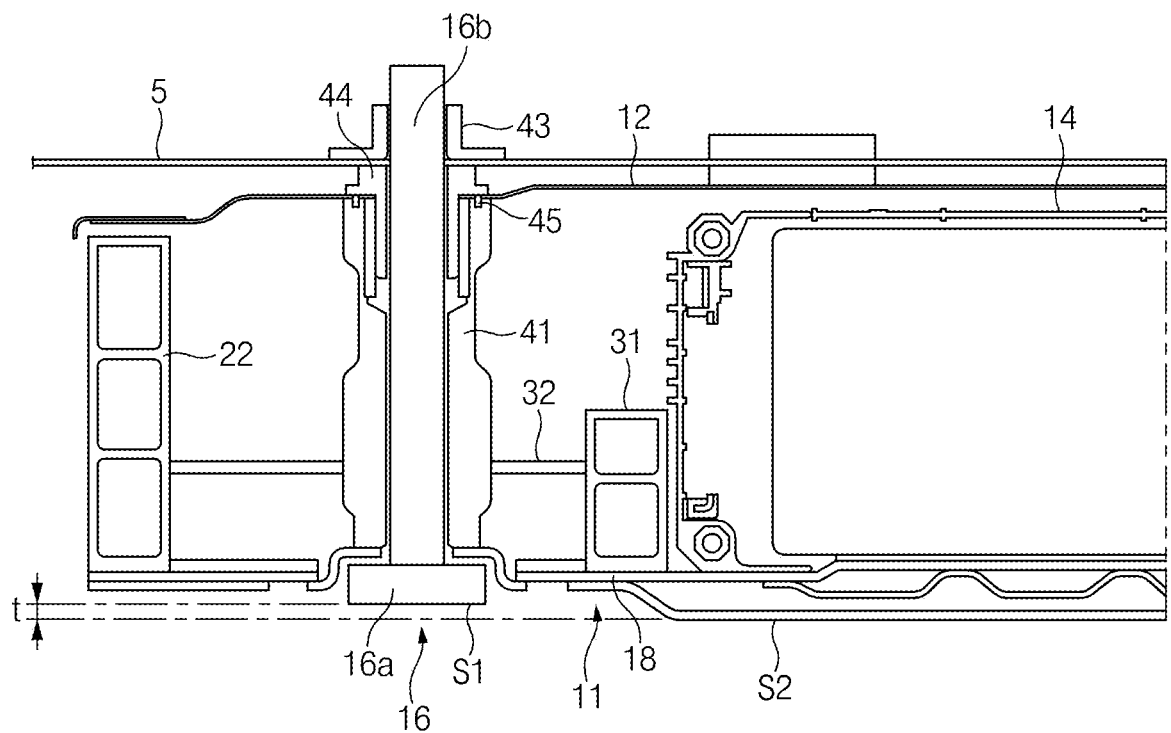
FIG. 4 illustrates a cross-sectional view taken along line A-A of FIG. 2.

According to various exemplary embodiments of the present invention, a pair of front mounting bolts 16 may pass vertically through the front structure of the battery case 11 adjacent to the front wall structure 21 and 22, and the pair of front mounting bolts 16 may be disposed symmetrically with respect to the center line of the battery case 11. Referring to FIG. 4, a pipe 41 may pass vertically through the front internal space of the battery case 11, a cap 44 may be mounted on a top end portion of the pipe 41, and a sealing member 45 may be mounted between the cap 44 and the top end portion of the pipe 41. The floor panel 5 of the vehicle may have a mounting hole through which a threaded section 16*b* of the front mounting bolt 16 passes, and a nut 43 may be fixed to the circumference of the mounting hole by welding and/or the like. The threaded section 16*b* of the front mounting bolt 16 may pass through the interior of the pipe 41, and the threaded section 16*b* of the front mounting bolt 16 may be fastened to the nut 43 so that the front structure of the battery case 11 may be mounted on the lower member (for example, the floor panel 5) of the vehicle. A bottom surface S1 of a head portion 16*a* of the front mounting bolt 16 may be located higher than a bottom surface S2 of the battery case 11 with a predetermined distance t. Thus, stiffness with respect to the vehicle body and the battery assembly 10 may be secured in the event of an impact.

Referring to FIG. 2, the pair of front mounting bolts 16 may pass through the internal space of the battery case 11 adjacent to the pair of front inclined walls 22. The pair of front mounting bolts 16 may be disposed symmetrically with respect to the center line of the battery case 11.

The battery assembly 10 according to various exemplary embodiments of the present invention may include a reinforcing crossmember 31 disposed between the pair of front inclined walls 22, and the reinforcing crossmember 31 may extend in a width direction of the battery case 11. During a front impact of the vehicle, when the front sub-frame located in front of the battery case 11 hits the front wall structure 21 and 22, the reinforcing crossmember 31 may stably support the front flat wall 21 and the front inclined walls 22, improving crash safety (impact performance) and stiffness with respect to the front structure of the battery case 11.

According to various exemplary embodiments of the present invention, each end portion of the reinforcing crossmember 31 may be adjacent to the front end portion of the side wall 13 and a rear end portion of the front inclined wall 22.

According to another exemplary embodiment of the present invention, each end portion of the reinforcing crossmember 31 may be directly connected to the front end portion of the side wall 13, and thus a load may be distributed more uniformly.

The battery assembly 10 according to various exemplary embodiments of the present invention may include a plurality of front reinforcement members 32 and 33 extending from the reinforcing crossmember 31 toward the front wall structure 21 and 22, and the plurality of front reinforcement members 32 and 33 may extend in a longitudinal direction of the battery case 11.

The plurality of front reinforcement members 32 and 33 may include a pair of first front reinforcement members 32 connecting the front inclined walls 22 and the reinforcing crossmember 31, and a pair of second front reinforcement members 33 connecting the recessed flat wall 23 and the reinforcing crossmember 31.

Each first front reinforcement member 32 may connect the front inclined wall 22 and the reinforcing crossmember 31. The first front reinforcement members 32 may surround the front mounting bolts 16, respectively. Referring to FIG. 4, the first front reinforcement member 32 may be joined to an external surface of the pipe 41, improving stiffness of the front mounting bolt 16 and the pipe 41.

Each first front reinforcement member 32 may extend in the longitudinal direction of the battery case 11, and may connect each front inclined wall 22 and the reinforcing crossmember 31. As the first front reinforcement members 32 surround the front mounting bolts 16, support stiffness of the front mounting bolts 16 may be increased, and the first front reinforcement members 32 may minimize deformation of the battery case 11 and improve structural stiffness of the battery case 11.

Referring to FIG. 2 and FIG. 3, the pair of second front reinforcement members 33 may be spaced from each other in the width direction of the battery case 11, and each second front reinforcement member 33 may extend in the longitudinal direction of the battery case 11. The rear portion of the high voltage connector 17 may be located between the pair of second front reinforcement members 33. The pair of second front reinforcement members 33 may support the recessed flat wall 23, preventing deformation of the recessed flat wall 23 and improving stiffness of the recessed flat wall 23. The high voltage fuse 19 may be located between the first front reinforcement member 32 and the second front reinforcement member 33 which are located on the left side of the battery case 11.

Referring to FIG. 3, an impact load in a front impact of the vehicle may be distributed along the pair of front inclined walls 22 and the pair of side walls 13, as the impact load is distributed along the pair of first front reinforcement members 32 and the pair of second front reinforcement members 33, the impact load may be effectively absorbed or dissipated. The front structure of the battery case 11 may effectively prevent deformation which may be caused by the impact load, enhancing safety with respect to the high voltage electric/electronic components mounted in the front internal space of the battery case 11.

According to exemplary embodiments of the present invention, the front structure of the battery case 11 may be simplified by the front flat wall 21 and the pair of front inclined walls 22, and accordingly the welding spots may be relatively reduced. Thus, the welding quality may be improved and the cost may be reduced.

According to exemplary embodiments of the present invention, as the front structure of the battery case 11 has the recessed cavity 20 configured for concealing the high voltage connector 17, disconnection, fire, and/or the like due to the damage of the high voltage connector 17 in the event of an impact (collision) may be effectively prevented.

According to exemplary embodiments of the present invention, the impact load may be effectively distributed through the reinforcing crossmember 31, the pair of first front reinforcement members 32, and the pair of second front reinforcement members 33 disposed in the front internal space of the battery case 11. Thus, the deformation of the front structure of the battery case 11 due to the impact load may be minimized or prevented, and the safety of the high voltage electric/electronic components mounted in the front internal space of the battery case 11 may be increased.

According to exemplary embodiments of the present invention, as the front mounting bolts 16 pass through the front internal space of the battery case 11, the deformation of the front structure of the battery case 11 may be minimized, as the first front reinforcement members 32 surround the front mounting bolts 16, damage of the front mounting bolts 16 may be minimized.

For convenience in explanation and accurate definition in the appended claims, the terms "upper", "lower", "inner", "outer", "up", "down", "upwards", "downwards", "front", "rear", "back", "inside", "outside", "inwardly", "outwardly", "internal", "external", "inner", "outer", "forwards", and "backwards" are used to describe features of the exemplary embodiments with reference to the positions of such features as displayed in the figures. It will be further understood that the term "connect" or its derivatives refer both to direct and indirect connection.

The foregoing descriptions of specific exemplary embodiments of the present invention have been presented for purposes of illustration and description. They are not intended to be exhaustive or to limit the present invention to the precise forms disclosed, and obviously many modifications and variations are possible in light of the above teachings. The exemplary embodiments were chosen and described to explain certain principles of the present invention and their practical application, to enable others skilled in the art to make and utilize various exemplary embodiments of the present invention, as well as various alternatives and modifications thereof. It is intended that the scope of the present invention be defined by the Claims appended hereto and their equivalents.

What is claimed is:

1. A battery assembly for a vehicle, the battery assembly comprising:
    a battery case including a front wall structure, a rear wall structure, and a pair of side walls connected to the front wall structure and the rear wall structure;
    a recessed cavity provided in a front of the battery case; and
    a battery cover with which a top portion of the battery case is covered,
    wherein the front wall structure includes a front flat wall and a pair of front inclined walls which are opposite on a first side and a second side of the front flat wall,
    wherein each of the pair of front inclined walls is formed to be inclined from the front flat wall to a front end portion of a corresponding side wall among the pair of side walls, and
    wherein a voltage connector is disposed in the recessed cavity.

2. The battery assembly according to claim 1, wherein the recessed cavity is formed to be recessed from the front flat wall into a front internal space of the battery case.

3. The battery assembly according to claim 2,
    wherein the recessed cavity is defined by a recessed flat wall and a pair of recessed side walls connected to the recessed flat wall,
    wherein the recessed flat wall is offset from the front flat wall toward the front internal space of the battery case with a predetermined distance, and
    wherein the pair of recessed side walls are opposite on a first side and a second side of the recessed flat wall.

4. The battery assembly according to claim 3, wherein the voltage connector is mounted on the recessed flat wall.

5. The battery assembly according to claim 3, further including:
    a reinforcing crossmember mounted between the pair of front inclined walls,
    wherein the reinforcing crossmember is formed to extend in a width direction of the battery case.

6. The battery assembly according to claim 5, further including:
    a plurality of front reinforcement members extending from the reinforcing crossmember toward the front wall structure,
    wherein each of the front reinforcement members is formed to extend in a longitudinal direction of the battery case.

7. The battery assembly according to claim 6,
    wherein the plurality of front reinforcement members include a pair of first front reinforcement members connecting the pair of front inclined walls and the reinforcing crossmember.

8. The battery assembly according to claim 7,
    wherein the plurality of front reinforcement members further include a pair of second front reinforcement members connecting the recessed flat wall and the reinforcing crossmember.

9. The battery assembly according to claim 8, wherein a voltage fuse is located between one of the first front reinforcement member and one of the pair of second front reinforcement members.

10. The battery assembly according to claim 6,
    wherein the plurality of front reinforcement members include a pair of second front reinforcement members connecting the recessed flat wall and the reinforcing crossmember.

11. The battery assembly according to claim 7,
    wherein the battery case is mounted on a lower member of the vehicle through a front mounting bolt,
    wherein the front mounting bolt passes through a portion of the battery case, and
    wherein at least one of the pair of first front reinforcement members surrounds the front mounting bolt.

12. The battery assembly according to claim 11,
    wherein the lower member is at least one of a dash panel, a floor panel, and a crossmember between the dash panel and the floor panel.

13. The battery assembly according to claim 11,
wherein a bottom surface of a head portion of the front mounting bolt is located higher than a bottom surface of the battery case.

14. The battery assembly according to claim 1, wherein the battery case includes a side mount extending outwards from each of the pair of side walls.

15. The battery assembly according to claim 1, wherein the pair of front inclined walls is disposed symmetrically with respect to a center line of the battery case.

16. The battery assembly according to claim 1, wherein the rear wall structure is positioned opposite to the front wall structure with respect to the battery case,
wherein the rear wall structure includes a rear flat wall and a pair of rear inclined walls which are opposite on a first side and a second side of the rear flat wall, and
wherein each of the pair of rear inclined walls is formed to be inclined from the rear flat wall to a front end portion of a corresponding side wall among the pair of side walls.

17. The battery assembly according to claim 15, wherein the pair of rear inclined walls is disposed symmetrically with respect to a center line of the battery case.

18. The battery assembly according to claim 1, further including:
a pipe passing through a front internal space of the battery case;
a mounting bolt connecting the battery case to a floor panel of the vehicle through the pipe;
a cap mounted on a top end portion of the pipe; and
a sealing member mounted between and the top end portion of the pipe and the battery cover.

* * * * *